United States Patent
Kuwata

(10) Patent No.: US 9,391,482 B2
(45) Date of Patent: Jul. 12, 2016

(54) GREASE LEAKAGE PREVENTING STRUCTURE FOR GEAR REDUCER

(71) Applicant: ORIENTAL MOTOR CO., LTD., Tokyo (JP)

(72) Inventor: Shinya Kuwata, Ibaraki (JP)

(73) Assignee: Oriental Motor Co., Ltd., Tokyo (JP)

( * ) Notice: Subject to any disclaimer, the term of this patent is extended or adjusted under 35 U.S.C. 154(b) by 0 days.

(21) Appl. No.: 14/762,734

(22) PCT Filed: Jan. 15, 2014

(86) PCT No.: PCT/JP2014/050509
§ 371 (c)(1),
(2) Date: Jul. 22, 2015

(87) PCT Pub. No.: WO2014/125855
PCT Pub. Date: Aug. 21, 2014

(65) Prior Publication Data
US 2015/0372556 A1 Dec. 24, 2015

(30) Foreign Application Priority Data

Feb. 13, 2013 (JP) ................................. 2013-025484

(51) Int. Cl.
*F16J 15/40* (2006.01)
*H02K 5/10* (2006.01)
(Continued)

(52) U.S. Cl.
CPC ................ *H02K 5/10* (2013.01); *F16H 57/029* (2013.01); *F16H 57/0464* (2013.01);
(Continued)

(58) Field of Classification Search
CPC ......... F16J 15/162; F16J 15/40; F16J 15/406; F16J 15/54
See application file for complete search history.

(56) References Cited

U.S. PATENT DOCUMENTS 5,251,406 A  10/1993  Kim
(Continued)

FOREIGN PATENT DOCUMENTS

CN  2442035 Y  8/2001
CN  101149079 A  3/2008
(Continued)

OTHER PUBLICATIONS

International Preliminary Report on Patentability for Application No. PCT/JP2014/050509 dated Aug. 18, 2015.
(Continued)

*Primary Examiner* — Gilbert Lee
(74) *Attorney, Agent, or Firm* — Alston & Bird LLP

(57) ABSTRACT

A grease leakage preventing structure is provided for a gear reducer of a dynamoelectric machine with a gear reducer, which is capable of preventing, if soft grease with high consistency is employed in a gear reducer driven at a high speed for high output power, leakage of grease from the reducer toward the dynamoelectric machine, by covering an output shaft of the dynamoelectric machine with a grease blocking member. In a grease leakage preventing structure for a gear reducer of a dynamoelectric machine with the gear reducer, in which gear teeth are provided in a leading edge portion of the output shaft of the dynamoelectric machine, the leading edge portion of the dynamoelectric machine output shaft is introduced into a case of the gear reducer via an input port of the gear reducer, and the dynamoelectric machine output shaft with the gear teeth is engaged with a gear arranged inside the case of the gear reducer, the grease leakage preventing structure is provided with a grease blocking member (3A, 3B, 3C, 3D) provided on a terminal end of an engagement portion (16b) of the dynamoelectric machine output shaft (14A) and is configured to inhibit inflow of grease into the dynamoelectric machine, and in this structure, the grease blocking member (3A, 3B, 3C, 3D) is provided with a wall surface portion (3Aa, 3Ba, 3Ca, 3Da) formed in a direction perpendicular to the gear teeth (16) provided in the leading edge portion of the dynamoelectric machine output shaft (14A).

6 Claims, 7 Drawing Sheets

(51) Int. Cl.
*F16J 15/44* (2006.01)
*F16H 57/029* (2012.01)
*H02K 7/116* (2006.01)
*F16H 57/04* (2010.01)

(52) U.S. Cl.
CPC ............ *F16H 57/0495* (2013.01); *F16J 15/40* (2013.01); *F16J 15/406* (2013.01); *F16J 15/44* (2013.01); *H02K 7/116* (2013.01)

(56) References Cited

U.S. PATENT DOCUMENTS

| 5,609,468 | A | * | 3/1997 | Burgess | ............ | F04D 29/2266 |
| | | | | | | 415/171.1 |
| 6,578,850 | B1 | * | 6/2003 | Rothlisberger | ........ | F16J 15/406 |
| | | | | | | 277/347 |
| 2008/0075401 | A1 | | 3/2008 | Dorner et al. | | |
| 2008/0196523 | A1 | | 8/2008 | Liu | | |
| 2010/0102515 | A1 | | 4/2010 | Miyazawa et al. | | |

FOREIGN PATENT DOCUMENTS

| CN | 101725702 A | 6/2010 |
|---|---|---|
| DE | 3330473 A1 | 5/1984 |
| JP | 54-38759 | 3/1979 |
| JP | 55-181466 | 12/1980 |
| JP | S-589056 U | 1/1983 |
| JP | 6-48210 | 12/1994 |
| JP | H09 072406 A | 3/1997 |
| JP | 11-93877 | 4/1999 |
| JP | 2007-154998 A | 6/2007 |
| JP | 2008-236903 | 10/2008 |
| JP | 2008-259368 | 10/2008 |

OTHER PUBLICATIONS

International Search Report for Application No. PCT/JP2014/050509, dated Apr. 11, 2014.

Written Opinion for International Application No. PCT/JP2014/050509 dated Apr. 22, 2014.

Office Action for Korean Application No. 10-2015-7019580 dated Nov. 18, 2015.

Office Action from corresponding Chinese Patent Application No. 201480004692.5 dated Feb. 26, 2016.

Extended European Search Report from corresponding European Patent Application No. 14752120.7 dated Jan. 26, 2016.

* cited by examiner (a)

(b)

109A (a)

109A
109a (b)

109B
109b

GREASE LEAKAGE PREVENTING STRUCTURE FOR GEAR REDUCER

CROSS-REFERENCE TO RELATED APPLICATIONS

This application is a national stage application filed under 35 U.S.C. 371 of International Application No. PCT/JP2014/050509, filed Jan. 15, 2014, which claims priority from Japanese Patent Application No. 2013-025484, filed Feb. 13, 2013, each of which is incorporated by reference herein in its entirety.

BACKGROUND OF THE INVENTION

1. Technical Field

The present invention relates to a grease leakage preventing structure for a gear reducer in a dynamoelectric machine with a gear reducer.

2. Background Art

FIG. 8 illustrates an electric motor with a gear reducer that is one type of dynamoelectric machine with a gear reducer, in which a gear case 104 of a gear reducer 103 is engaged with and integrally assembled with, with bolts, not shown in the drawing, a bracket 102 on a protruding edge thereof, the bracket 102 being press-fitted into an opening end of an electric motor case 101 of an electric motor 100.

In such an electric motor with a gear reducer, in order to smoothly transmit rotation, a structure is employed in which helically cut gear teeth are provided on an output shaft of the electric motor to assemble the shaft with a helical gear of the reducer.

However, a problem may arise in which grease adhered to the helical gear inside the reducer may flow out according to rotation of the gear via the tooth trace of the electric motor output shaft with the helically cut gear teeth and penetrate into the electric motor outside the case.

As a conventional structure for preventing grease leakage in a gear reducer of the electric motor with a gear reducer of this type, a method has been known in which an oil seal is used to prevent the infiltration of grease into the inside of the electric motor.

Referring to FIG. 9, in this method, oil seals 109 are arranged on a base end of a gear tooth portion 106a of an electric motor output shaft 106, which protrudes into an inside of the gear case 104 via an open hole 105a formed on a side panel 105 of the gear reducer 103. The oil seal 109 is arranged on the base end of the gear tooth portion 106a of the electric motor output shaft 106 together with the bearing 107 arranged on the bracket 102 of the electric motor case 101. The helical gear 108 is engaged with the electric motor output shaft 106 in the inside of the gear case 104.

However, in the method using the oil seals 109, because friction load is applied due to the contact between the oil seal and the electric motor output shaft 106, the ratio of loss becomes great in a low-output electric motor. In addition, in providing the oil seals 109, it is necessary to detour around the gear tooth portion 106a of electric motor output shaft 106, and it therefore becomes necessary to design the dimension of the oil seal so that it becomes long enough for detouring around the gear teeth. In particular, in thin-type electric motors, the thickness of the oil seal portion causes a problem.

In this regard, related art is known, as illustrated in FIG. 10, in which a flexible tube 110 is provided so as to cover the gear tooth portion 106a of the electric motor output shaft 106, except for a portion of engagement with the helical gear 108 (see Patent Literature 1).

Furthermore, as illustrated in FIG. 11, related art has been known in which a helical groove 201 is provided, which helically goes around an electric motor output shaft 200 from the side of a bearing of the electric motor toward the side of the gear reducer (see Patent Literature 2).

CITATION LIST

Patent Literature

Patent Literature 1: JP 06-48210 Y
Patent Literature 2: JP 2008-236903 A

SUMMARY OF INVENTION

Technical Problem

In this regard, in such conventional structures for preventing grease leakage for gear reducers, if relatively hard grease with low consistency (NLGI Consistency No. 2) is employed in a gear reducer, grease leakage can be prevented by covering the electric motor output shaft 106 with flexible tube 110 or by forming helical groove 201 on the electric motor output shaft 200.

However, problems may arise in cases of gear reducers driven at high rotation speeds for high output power, in which the grease may be splattered in the centrifugal direction of the gear due to the centrifugal force from the high-speed rotation of the gear, and thus, the grease would not enter into the gear in a sufficient amount, which may reduce the service life of the gear reducer. Thus, it is necessary to employ soft grease with high consistency (NLGI Consistency No. 0) for gear reducers driven at high speed for high output power. However, in the case of using grease which is softer and having a higher consistency compared with NLGI Consistency No. 0 grease, grease leakage cannot be prevented by covering the electric motor output shaft 106 with the flexible tube 110 as illustrated in FIG. 10 or by forming the helical groove 201 on the electric motor output shaft 200 as illustrated in FIG. 11. Furthermore, complex processes may be required and the processing costs may be high to form the helical groove 201 on the shaft portion of the electric motor output shaft 200. In particular, if the electric motor output shaft is provided with helically cut gear teeth, when the electric motor is rotated in a rotation direction illustrated in FIG. 12, the grease in the gear reducer is drawn out toward the electric motor as indicated by solid arrows. Due to this pumping action, a large amount of grease may leak toward the electric motor as indicated by a dotted-line arrow in FIG. 12. Therefore, grease leakage cannot be prevented by taking measures so that the electric motor output shaft 106 is covered with the flexible tube 110 as illustrated in FIG. 9 and so that oil seals 109A of a single lip 109a are used as illustrated in FIG. 13(a).

To address these problems, the efficiency of prevention of grease leakage may be improved by using oil seals 109B including more lip portions 109b with a structure such as a triple lip structure illustrated in FIG. 13(b) as the oil seals 109; however, in this case, the problems may become more difficult in terms of the friction load, the thickness, and the costs compared with the case of using the oil seals 109A including the single lip structure. In particular, in the case of thin electric motors, the thickness of the oil seal 109 becomes greater than the thickness of the stator of the electric motor, which may thus impair the merits of the thin type electric motors, and in addition, the ratio of decrease in the output torque may become even higher due to the friction load from the oil seals 109.

The purpose of the present invention is to provide a grease leakage preventing structure for a gear reducer of a dynamoelectric machine with the gear reducer capable of solving the above-described problems and preventing, if soft grease with high consistency is employed in a gear reducer driven at a high speed for high output power, leakage of grease from the reducer toward the dynamoelectric machine by covering an output shaft of the dynamoelectric machine with a grease blocking member.

Solution to Problem

In order to solve the above-described problems, according to an aspect of the present invention, the present invention is a grease leakage preventing structure for a gear reducer of a dynamoelectric machine with the gear reducer, in which gear teeth are provided in a leading edge portion of an output shaft of the dynamoelectric machine, the leading edge portion of the dynamoelectric machine output shaft is introduced into a case of a gear reducer via an input port of the gear reducer, and the dynamoelectric machine output shaft with the gear teeth is engaged with a gear arranged inside the case of the gear reducer, and the grease leakage preventing structure includes a grease blocking member provided on a terminal end of an engagement portion of the dynamoelectric machine output shaft and configured to inhibit inflow of grease into the dynamoelectric machine, and in this structure, the grease blocking member is provided with a wall surface portion formed in a direction perpendicular to the gear teeth provided in the leading edge portion of the dynamoelectric machine output shaft.

In addition, according to an aspect of the present invention, a plurality of protrusions is provided on a surface of a cylindrical portion of the grease blocking member formed in a direction perpendicular to the gear teeth provided in the leading edge portion of the dynamoelectric machine output shaft as the wall surface portion of the grease blocking member.

Furthermore, according to an aspect of the present invention, V-shaped or U-shaped protrusions are provided in the cylindrical portion of the grease blocking member at two or more locations along an axial direction as the wall surface portion of the grease blocking member.

Furthermore, according to an aspect of the present invention, V-shaped or U-shaped cutout portions are provided in the cylindrical portion of the grease blocking member formed in a peripheral portion of a leading edge of the cylindrical portion at at least one location along an axial direction as the wall surface portion of the grease blocking member.

In addition, according to an aspect of the present invention, the grease blocking member is provided with a flange portion provided on a base end thereof.

Furthermore, according to an aspect of the present invention, the grease blocking member is provided with a tapered portion provided between the cylindrical portion and the flange portion and having a diameter gradually expanding from the cylindrical portion.

Furthermore, according to an aspect of the present invention, the grease blocking member is made of aluminium and is mounted by press-fitting to the dynamoelectric machine output shaft.

In addition, according to an aspect of the present invention, helically cut gear teeth are provided as the gear teeth provided as the gear teeth provided in the leading edge portion of the dynamoelectric machine output shaft.

Advantageous Effects of Invention

According to the present invention, if soft grease with high consistency is employed in a gear reducer driven at a high speed for high output power, leakage of grease from the reducer toward the dynamoelectric machine can be prevented by covering the output shaft of the dynamoelectric machine with the grease blocking member.

BRIEF DESCRIPTION OF DRAWINGS

FIG. 3 illustrates a grease blocking member for preventing inflow of grease, in which FIG. 3(a) is a side view and FIG. 3(b) is a front view.

FIG. 5 illustrates a grease leakage preventing structure for a gear reducer of an electric motor with a gear reducer according to another embodiment of the present invention, in which FIG. 5(a) is a side view and FIG. 5(b) is a perspective view of the grease blocking member.

FIG. 6 illustrates a grease leakage preventing structure for a gear reducer of an electric motor with a gear reducer according to another embodiment of the present invention, in which FIG. 6(a) is a side view and FIG. 6(b) is a perspective view of the grease blocking member.

FIG. 7 illustrates a modification of the grease blocking member illustrated in FIG. 6, in which FIG. 7(a) is a side view and FIG. 7(b) is a perspective view of the grease blocking member.

FIG. 13 is a cross section of a conventional oil seal, in which FIG. 13(a) illustrates a single lip seal and FIG. 13(b) illustrates a triple lip seal.

DESCRIPTION OF EMBODIMENTS

Embodiments of the present invention will be described in detail below with reference to attached drawings.

Figure 1:
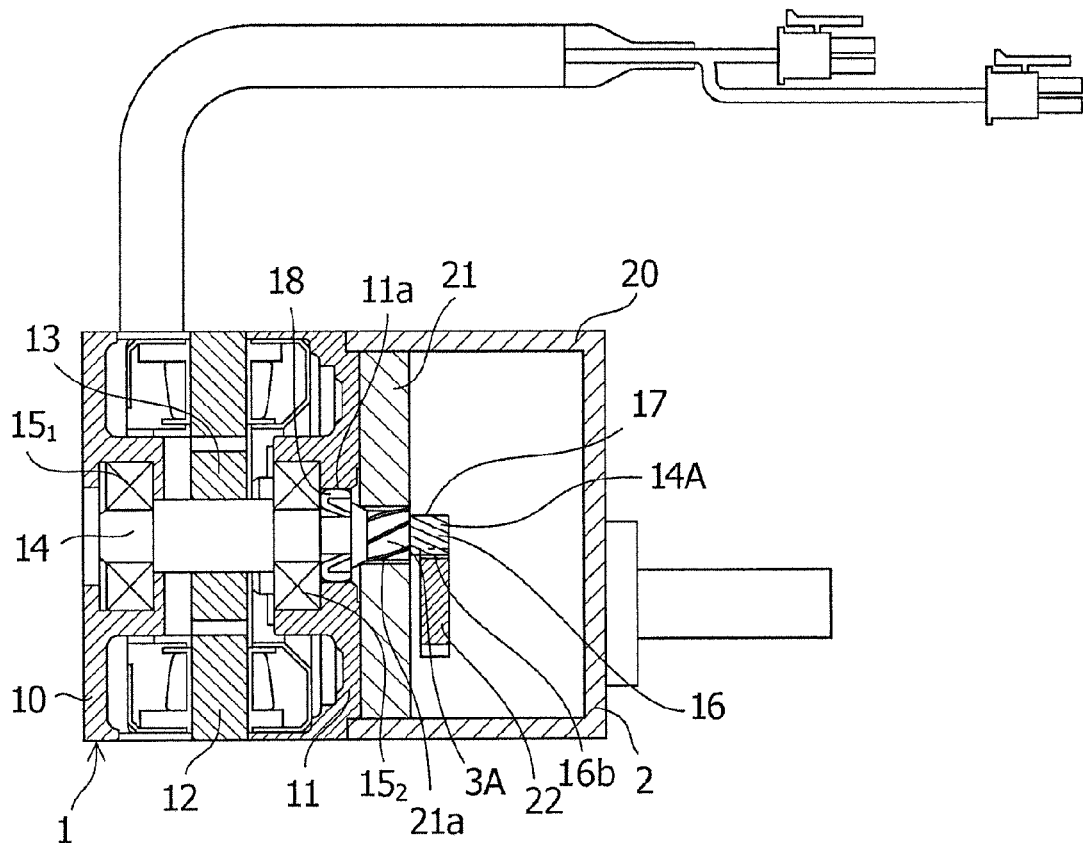
FIG. 1 is a cross section of a grease leakage preventing structure for a gear reducer of an electric motor with a gear reducer according to an embodiment of the present invention.
Figure 2:
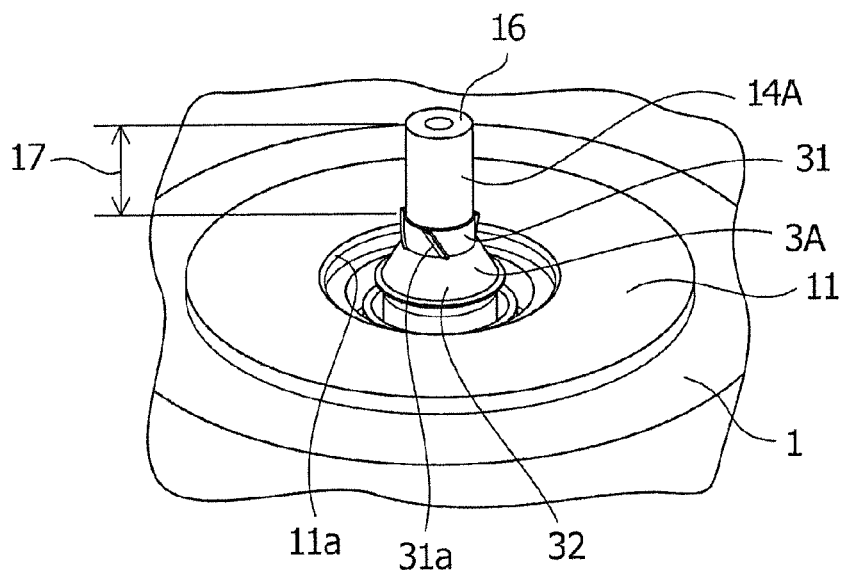
FIG. 2 illustrates a grease blocking member of the present application for preventing inflow of grease assembled to an output shaft of the electric motor.

FIG. 1 illustrates an electric motor with a gear reducer that is one type of dynamoelectric machine with a gear reducer according to the present invention, in which an inside of the gear reducer is not shown. FIG. 2 illustrates a grease blocking member mounted on an electric motor output shaft. FIGS. 3(a) and 3(b) are magnified views of the grease blocking member.

To describe a structure of an electric motor with a gear reducer with reference to FIGS. 1 to 3(a) and 3(b) first, the electric motor includes an electric motor main body 1, a gear reducer main body 2 that is assembled with the electric motor main body 1, and an electric motor case 10 constituting the electric motor main body 1, and a bracket 11 is provided, which is press-fitted on one opening end of the electric motor case 10. A gear case 20 of the gear reducer main body 2 is fitted with the bracket 11 on its protruding end, and the electric motor case 10 and the gear case 20 are integrally fastened with bolts, not shown in the drawings.

In the electric motor case 10 of the electric motor main body 1, a rotator 13 is concentrically arranged on an axis of a stator 12, and the rotator 13 is rotatably supported on both ends of a rotational shaft 14 via bearings $15_1$, $15_2$. In the rotator 13, one end of the rotational shaft 14 is delivered outward from an open hole 11a of the bracket 11, and thereby an electric motor output shaft 14A is constituted.

The electric motor output shaft 14A is provided with helically cut gear teeth 16, and a portion 17 with the helically cut gear teeth 16 is inserted into the gear case 20 of the gear reducer main body 2 through a hole 21a of a gear reducer flange 21 to be engaged with a helical gear 22 arranged inside the gear case 20. An oil seal 18 is a single lip oil seal arranged on an inner periphery surface of the open hole 11a of the bracket 11.

A grease blocking member 3A is a member for preventing leakage of grease, which is mounted by press-fitting onto the electric motor output shaft 14A at a location closer to the base end of the shaft than the portion 17 with the helically cut gear teeth 16. As illustrated in FIGS. 2 and 3(a) and 3(b), the grease blocking member 3A is constituted by a cylindrical portion 31 and an expansion portion 32, which is provided so as to form a shape of a horn in which the diameter gradually increases from one end of the cylindrical portion 31. On a surface of the cylindrical portion 31, a plurality of linear protrusions 31a is provided at a reverse angle from the helically cut gear teeth 16 in a leading edge portion of the electric motor output shaft 14A. In the protrusions 31a, a wall surface portion 3Aa of the protrusions 31a is formed in a direction perpendicular to the helically cut gear teeth 16 so as to block the grease flowing in and coming along the surface of the helically cut gear teeth 16 provided in the leading edge portion of the electric motor output shaft 14A.

The grease blocking member 3A is produced by die casting of aluminium or resin molding of silicon performed so that a plurality of linear protrusions 31a is provided at a reverse angle from the helically cut gear teeth 16 provided in the leading edge portion of the electric motor output shaft 14A. In mounting the grease blocking member 3A, the grease blocking member 3A is assembled with the electric motor output shaft 14A by press-fitting except for a portion 16b for engagement with the helical gear 22 of the reducer.

The grease blocking member 3A for preventing inflow of the grease into the electric motor is press-fitted to be engaged with the electric motor output shaft 14A on a terminal end of the shaft by detouring around the engagement portion 16b of the electric motor output shaft 14A, and the protrusions 31a of the grease blocking member 3A are arranged in the direction perpendicular to the helically cut gear teeth 16. In the above-described manner, the wall surface portion 3Aa for blocking inflow of the grease is provided on the front side of the protrusions 31a of the grease blocking member 3A.

Figure 4:
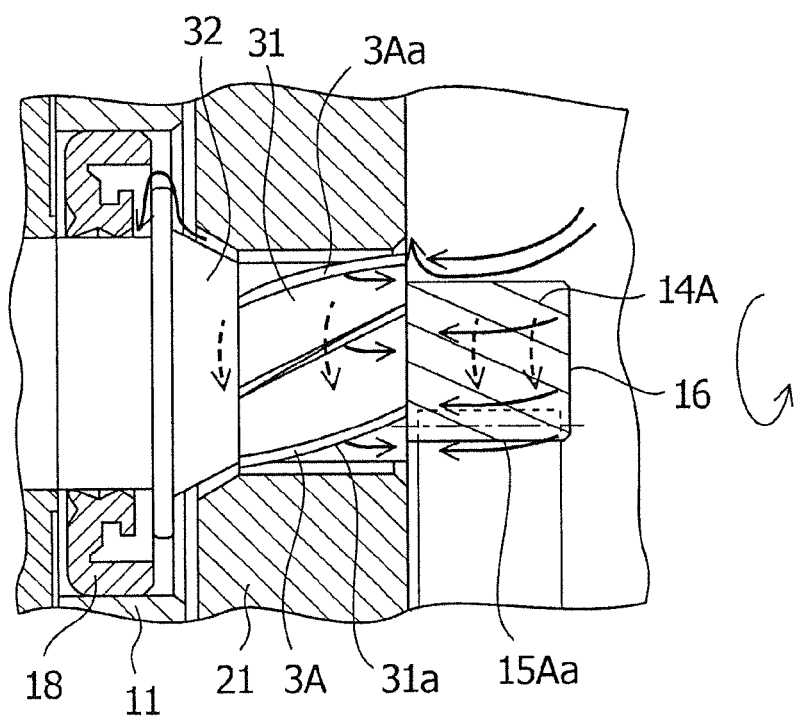
FIG. 4 is an explanatory view illustrating prevention of grease leakage by the grease blocking member for preventing inflow of grease.

Next, actions of the above-described embodiment will be described below. Referring to FIG. 4, in the helically cut gear teeth 16 of the rotational shaft 14, when the electric motor is rotated in a rotational direction illustrated in the drawing, a pumping action for drawing the grease in the gear reducer toward the electric motor is caused by the helically cut gear teeth 16 of the electric motor output shaft 14A as indicated by arrows in the drawing. With this configuration, if the grease comes out from the reducer, the grease blocking member 3A blocks inflow of the grease into the electric motor. Because the grease blocking member 3A is provided with a plurality of linear protrusions 31a that are formed in the reverse angle from the helically cut gear teeth 16 provided in the leading edge portion of the electric motor output shaft 14A, an action for forcing back the grease flowing out to the side of the electric motor due to the helically cut gear teeth 16 of the electric motor output shaft 14A toward the gear reducer is caused by the wall surface portion 3Aa as the linear protrusions 31a provided at the reverse angle from the helically cut gear teeth turn. With this configuration, leakage of the grease flowing out from inside the reducer via the gear reducer flange 21 to the side of the electric motor can be prevented.

Figure 3:
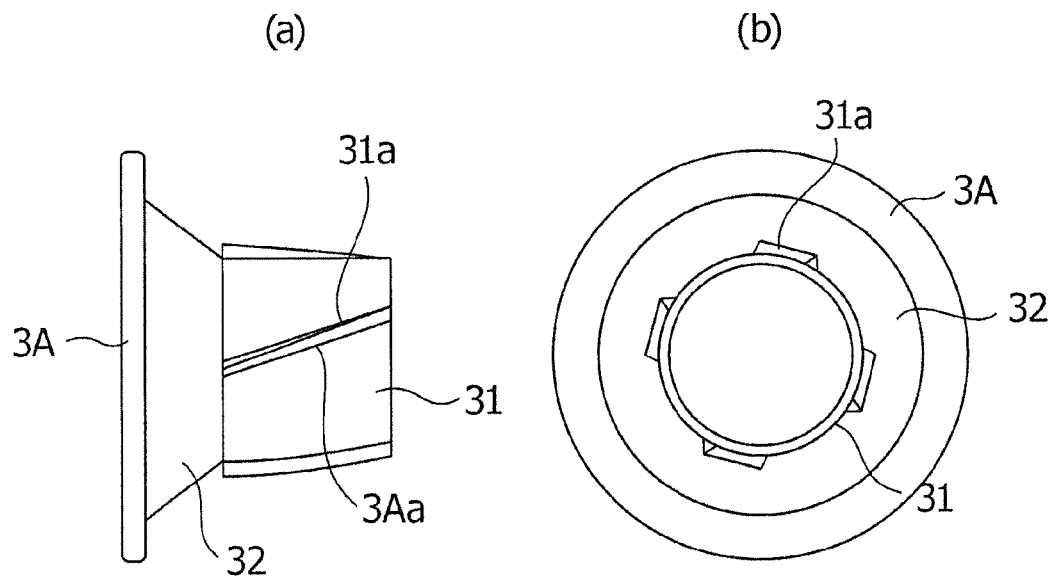
Figure 5:
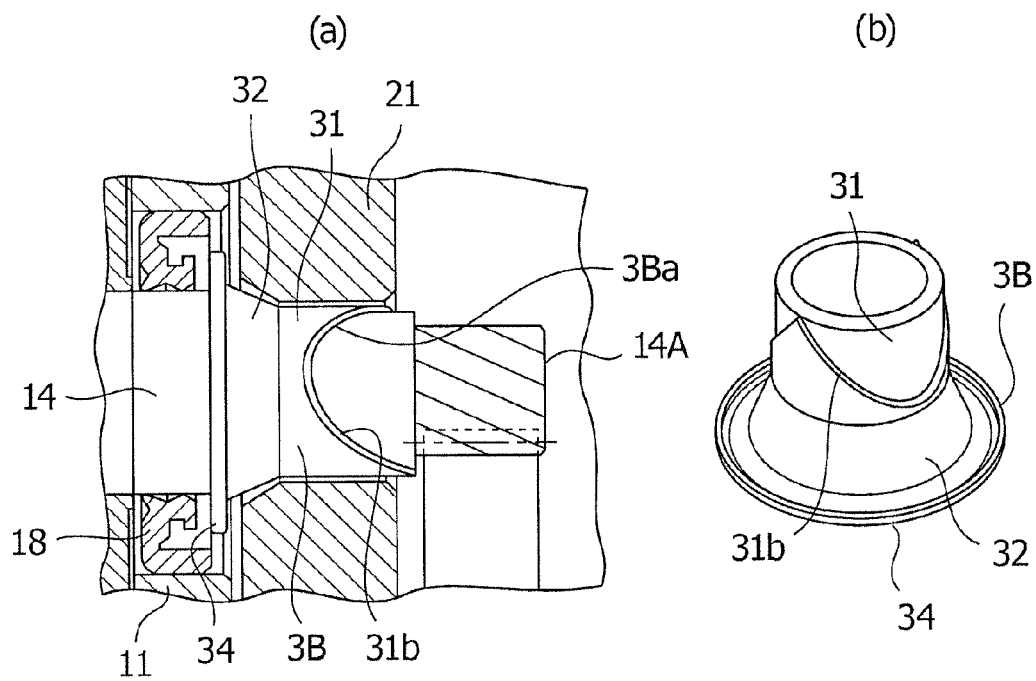

FIGS. 5(a) and 5(b) illustrate another embodiment of the grease blocking member 3 of the present invention, in which the same portions and components as those illustrated in FIGS. 3 and 4 are provided with the same reference symbols and numerals. A grease blocking member 3B is provided with V-shaped or U-shaped protrusions 31b formed on the cylindrical portion 31 at two locations.

As illustrated in FIGS. 5(a) and 5(b), the grease blocking member 3B is used, in which V-shaped or U-shaped protrusions 31b are provided in the cylindrical portion 31 at two or more locations, instead of the grease blocking member 3A. In this example, by forming the V-shaped protrusions 31b on the grease blocking member 3B, even if the grease has leaked over to reach the grease blocking member 3B, the leaked grease can be forced back by a wall surface portion 3Ba of the protrusions 31b provided at the reverse angle from the helically cut gear teeth as the grease blocking member 3B turns.

The protrusions 31b may be provided at more than two locations.

FIGS. 6(a) and 6(b) also illustrate another embodiment of the grease blocking member 3 of the present invention, in which the same portions and components as those illustrated in FIGS. 3 and 4 are provided with the same reference symbols and numerals. In this example, a grease blocking member 3C is provided with U-shaped cut portions 33 at two locations in the leading edge portion from the cylindrical portion 31 to the expansion portion 32.

As illustrated in FIGS. 6(a) and 6(b), instead of the grease blocking member 3A, the grease blocking member 3C is used in which the cut portions 33 are provided at two or more locations that cut the leading edge portion of the grease blocking member 3C in the V-like or U-like shape. By using the cut portions 33 formed in the leading edge portion of the grease blocking member 3C, infiltration of grease can be prevented by a wall surface portion 3Ca of the cut portions 33 provided at the reverse angle from the helically cut gear teeth, and similarly to the example that uses the grease blocking member 3B, grease accumulated in the cut portions 33 provided in the leading edge portion of the grease blocking member 3C can be forced back by the wall surface portion 3Ca toward the gear reducer as the grease blocking member 3C turns.

Figure 6:
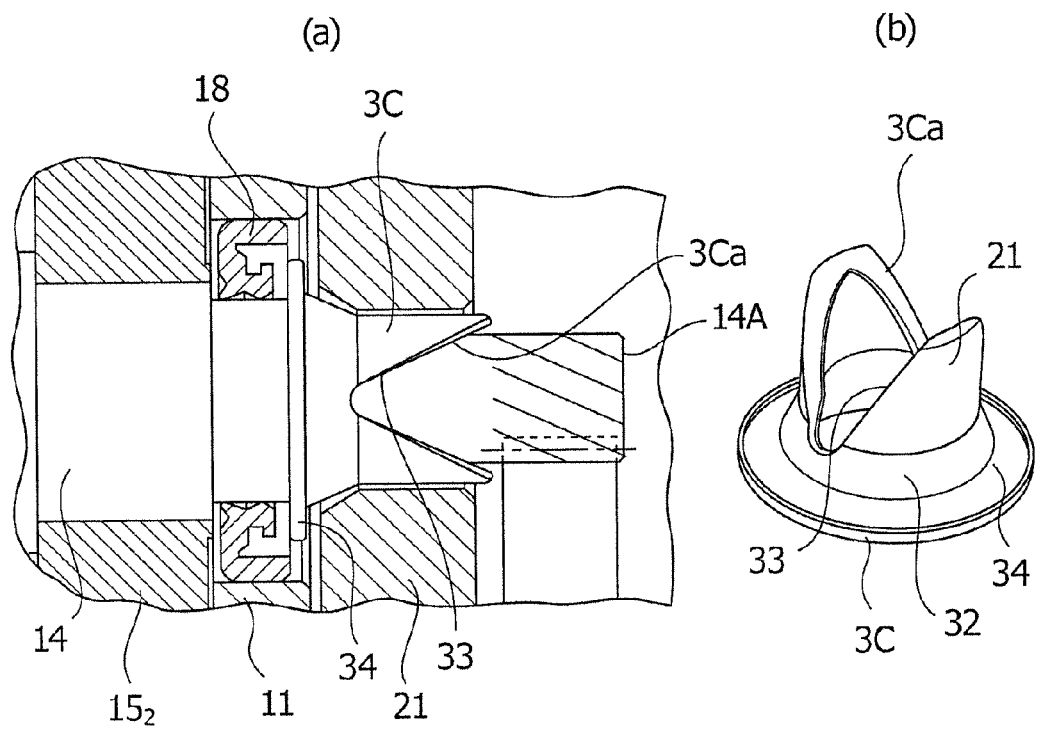

In the example illustrated in FIG. 6, the cut portions are provided at two locations; however, alternatively, the cut portion may provided at one location only (in this case, the cut portion is diagonally cut) or may be provided at more than two locations according to the diameter of the shaft of the electric motor output shaft.

By concurrently using the grease blocking member 3C and the single lip thin oil seal 18, infiltration of grease into the electric motor can be more effectively prevented. The grease blocking member 3C may be press-fitted to the electric motor output shaft 14A, and a labyrinth structure (flange portion) 34 which covers a lip portion of the oil seal 18 may be provided to the grease blocking member 3C at a location on the side of the electric motor. With this configuration, intrusion of grease into the electric motor can be absolutely blocked.

Figure 7:
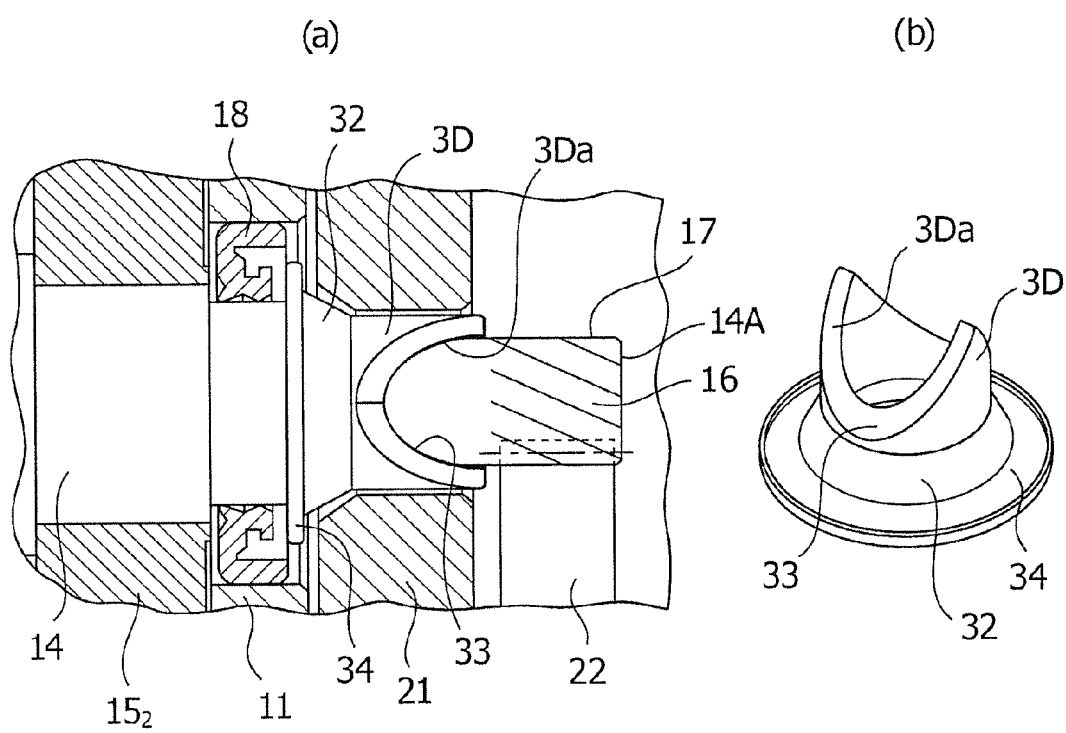
Figure 8:
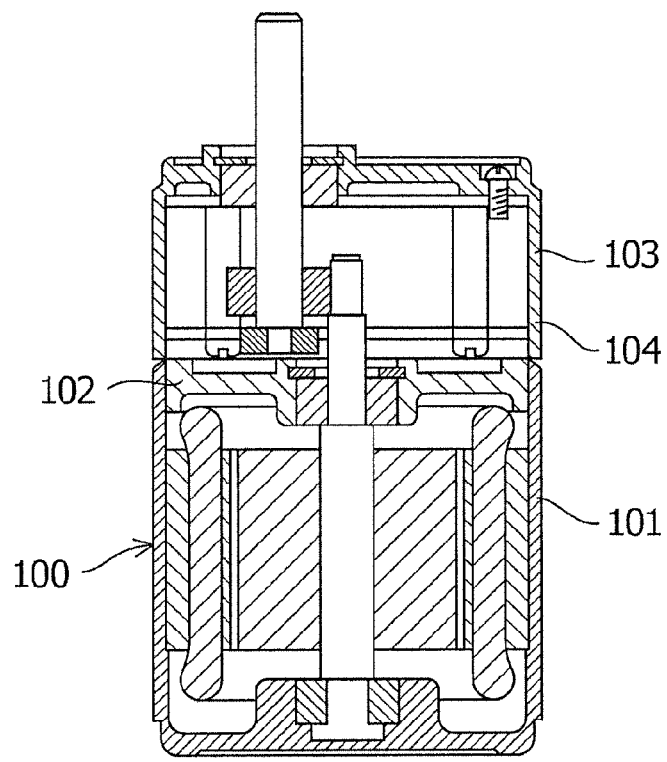
FIG. 8 is a cross section of a structure of a conventional electric motor with a gear reducer.
Figure 9:
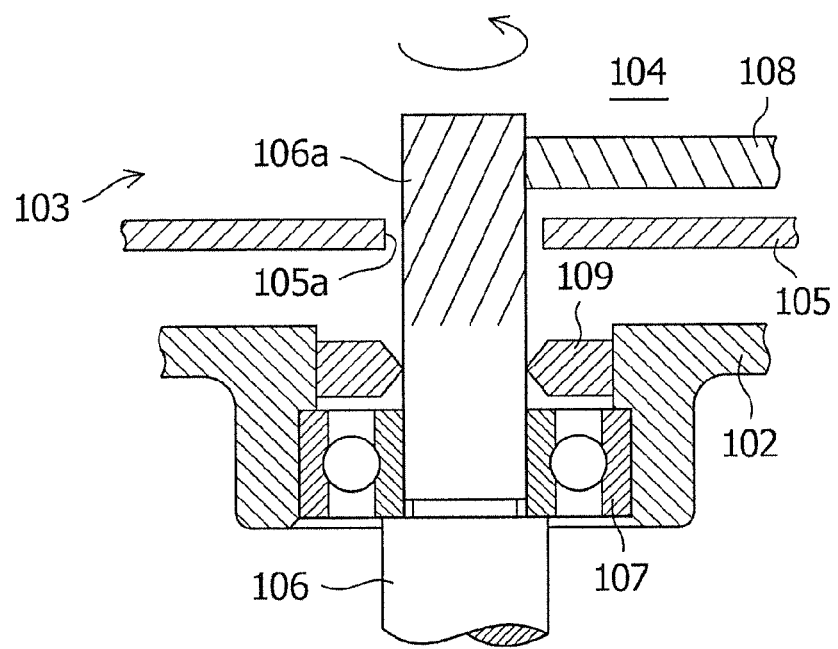
FIG. 9 illustrates a grease sealing structure of a conventional electric motor with a gear reducer.
Figure 10:
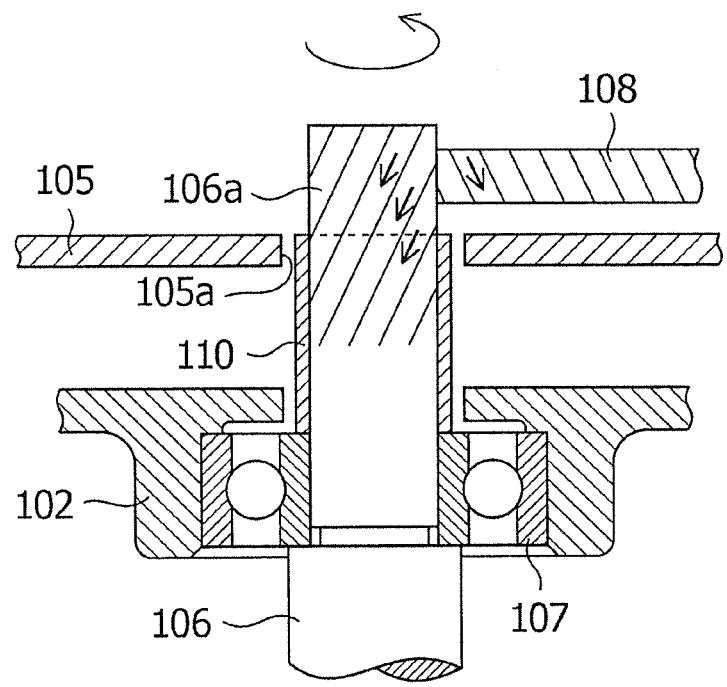
FIG. 10 illustrates a grease sealing structure of a conventional electric motor with a gear reducer.
Figure 11:
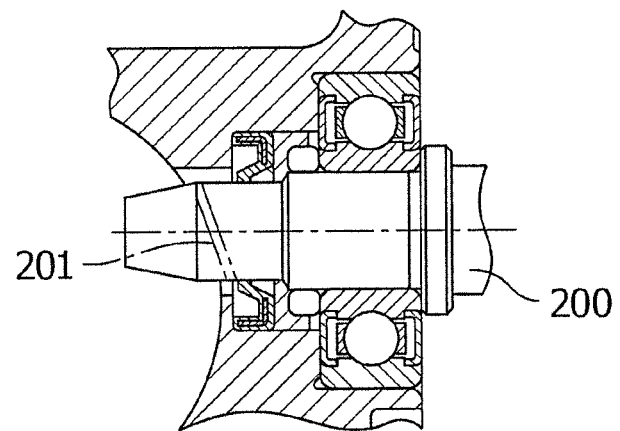
FIG. 11 illustrates a grease sealing structure of a conventional electric motor with a gear reducer.
Figure 12:
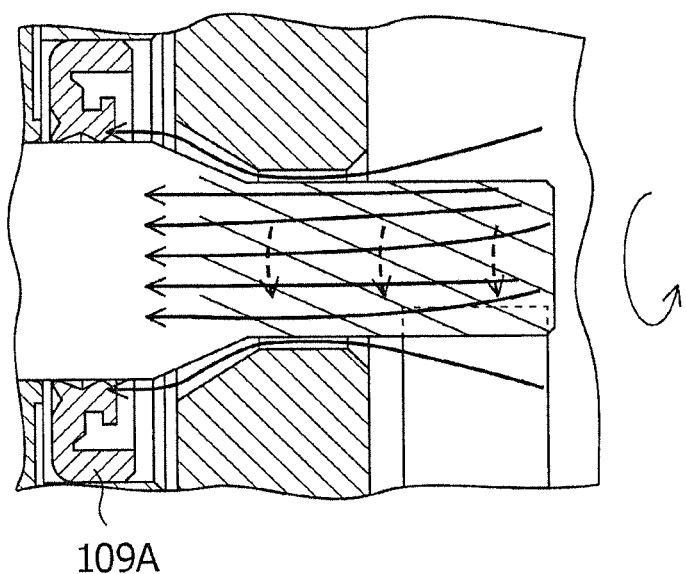
FIG. 12 is a conceptual diagram illustrating grease leakage in a conventional electric motor with a gear reducer.
Figure 13:
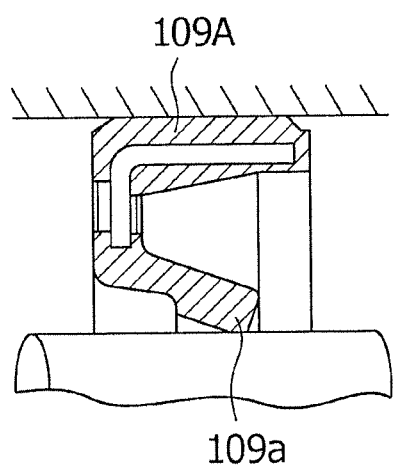
Figure 13:
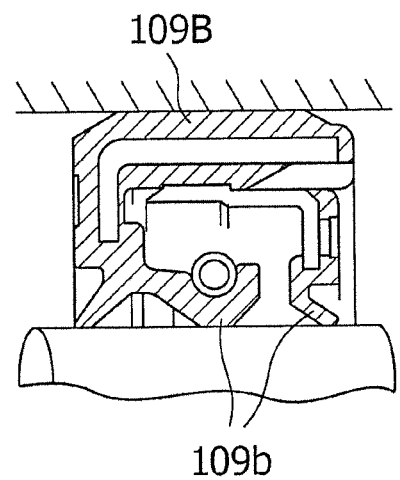

FIGS. 7(a) and 7(b) illustrate a modification of the example illustrated in FIGS. 6(a) and 6(b), in which the same portions and components as those in FIGS. 6(a) and 6(b) are provided with the same reference symbols and numerals and descriptions thereof are omitted below. In this modification, a grease blocking member 3D is formed, in which the cut portions 33 formed in the leading edge portion of the cylindrical portion 31 in the axial direction are cut diagonally in relation to the axial direction, so that the sections thereof face outward to allow a wall surface 3Da formed by the sections to be viewed from a lateral direction.

With the wall surface portion 3Da of the cut portions 33 provided in the leading edge portion of the grease blocking member 3D, grease coming along the electric motor output shaft 14A can be removed by chipping off the grease by using the diagonal wall surface portion 3Da of the cut portions 33 provided at the reverse angle from the helically cut gear teeth. Infiltration of grease can be prevented in the above-described manner, and similarly to the example illustrated in FIG. 3C, the grease accumulated in the cut portions 33 provided in the leading edge portion of the grease blocking member 3D can be forced back by the diagonal wall surface portion 3Da toward the gear reducer as the grease blocking member 3D rotates, by removing the grease by chipping it off.

With the above-described configuration, effects enumerated in the following can be achieved by the present invention.

If soft grease with high consistency is employed in a gear reducer driven at a high speed for high output power, leakage of grease flowing in from the reducer toward the electric motor via the electric motor output shaft 14A can be prevented by press-fitting the grease blocking member 3A, 3B, 3C, 3D to the base end of the electric motor output shaft 14A so as to cover the electric motor output shaft 14A and by assembling the grease blocking member 3A, 3B, 3C, 3D thereto except for a region of the portion 16b for engagement with the helical gear 22 of the reducer.

Note that the present invention is not limited to the embodiments described above, and various shapes can be applied as the shape of the grease blocking member 3, 3A, 3B, 3C, 3D, for example, and the grease blocking member can take any shape such as the shape of the linear protrusions 31a, the V-shaped protrusions 31b, and the cut portions 33 if the grease blocking member is capable of inhibiting inflow of the grease, and the present invention can of course be appropriately modified or altered within a range that does not change the technical scope of the present invention.

In addition, in the above-described exemplary embodiments, examples of the electric motors are described, and the present invention can be applied to a dynamoelectric machine provided with an output shaft that engages with a gear at an input port of the gear reducer. Examples of such a dynamoelectric machine includes dynamos, generators, and the like, and also includes clutch brakes, electromagnetic brakes, torque limiters, intermediate reducers, and the like, which are arranged between the electric motor and the gear reducer and configured to transmit the rotation of the output shaft of the electric motor to the gear reducer.

Furthermore, although the above-described embodiments use the helically cut gear teeth with which the amount of leakage of grease becomes relatively large due to the pumping action, the present invention can be implemented by using other types of gear teeth, such as straight teeth.

The invention claimed is:

1. A grease leakage preventing structure for a gear reducer of a dynamoelectric machine with the gear reducer, in which gear teeth are provided in a leading edge portion of an output shaft of a dynamoelectric machine, the leading edge portion of the dynamoelectric machine output shaft is introduced into a case of a gear reducer via an input port of the gear reducer, and the dynamoelectric machine output shaft with the gear teeth is engaged with a gear arranged inside the case of the gear reducer, the grease leakage preventing structure comprising:
a grease blocking member provided on a terminal end of an engagement portion of the dynamoelectric machine output shaft and configured to inhibit inflow of grease into the dynamoelectric machine,
wherein the grease blocking member is provided with a wall surface portion formed in a direction perpendicular to the gear teeth provided in the leading edge portion of the dynamoelectric machine output shaft,
wherein a plurality of protrusions is provided on a surface of a cylindrical portion of the grease blocking member formed in a direction perpendicular to the gear teeth provided in the leading edge portion of the dynamoelectric machine output shaft as the wall surface portion of the grease blocking member, and
wherein helically cut gear teeth are provided as the gear teeth provided in the leading edge portion of the dynamoelectric machine output shaft.

2. A grease leakage preventing structure for a gear reducer of a dynamoelectric machine with the gear reducer, in which gear teeth are provided in a leading edge portion of an output shaft of a dynamoelectric machine, the leading edge portion of the dynamoelectric machine output shaft is introduced into a case of a gear reducer via an input port of the gear reducer, and the dynamoelectric machine output shaft with the gear teeth is engaged with a gear arranged inside the case of the gear reducer, the grease leakage preventing structure comprising:
a grease blocking member provided on a terminal end of an engagement portion of the dynamoelectric machine output shaft and configured to inhibit inflow of grease into the dynamoelectric machine,
wherein the grease blocking member is provided with a wall surface portion formed in a direction perpendicular to the gear teeth provided in the leading edge portion of the dynamoelectric machine output shaft,
wherein V-shaped or U-shaped protrusions are provided in the cylindrical portion of the grease blocking member at two or more locations along an axial direction as the wall surface portion of the grease blocking member.

3. A grease leakage preventing structure for a gear reducer of a dynamoelectric machine with the gear reducer, in which gear teeth are provided in a leading edge portion of an output shaft of a dynamoelectric machine, the leading edge portion of the dynamoelectric machine output shaft is introduced into a case of a gear reducer via an input port of the gear reducer, and the dynamoelectric machine output shaft with the gear teeth is engaged with a gear arranged inside the case of the gear reducer, the grease leakage preventing structure comprising:
a grease blocking member provided on a terminal end of an engagement portion of the dynamoelectric machine output shaft and configured to inhibit inflow of grease into the dynamoelectric machine,
wherein the grease blocking member is provided with a wall surface portion formed in a direction perpendicular to the gear teeth provided in the leading edge portion of the dynamoelectric machine output shaft,
wherein V-shaped or U-shaped cutout portions are provided in the cylindrical portion of the grease blocking member formed in a peripheral portion of a leading edge of the cylindrical portion at at least one location along an axial direction as the wall surface portion of the grease blocking member.

4. The grease leakage preventing structure for a gear reducer of a dynamoelectric machine with the gear reducer according to claim 3, wherein the grease blocking member is provided with a flange portion provided on a base end thereof.

5. The grease leakage preventing structure for a gear reducer of a dynamoelectric machine with the gear reducer according to claim 4, wherein the grease blocking member is provided with a tapered portion provided between the cylindrical portion and the flange portion and having a diameter gradually expanding from the cylindrical portion.

6. The grease leakage preventing structure for a gear reducer of a dynamoelectric machine with the gear reducer according to claim 3, wherein the grease blocking member is made of aluminium and is mounted by press-fitting to the dynamoelectric machine output shaft.

* * * * *